United States Patent
Ko

(10) Patent No.: US 11,508,390 B1
(45) Date of Patent: Nov. 22, 2022

(54) VOICE TRANSMITTER ASSEMBLY

(71) Applicant: Sang Ko, Tacoma, WA (US)

(72) Inventor: Sang Ko, Tacoma, WA (US)

( * ) Notice: Subject to any disclaimer, the term of this patent is extended or adjusted under 35 U.S.C. 154(b) by 0 days.

(21) Appl. No.: 17/319,271

(22) Filed: May 13, 2021

(51) Int. Cl.
| | |
|---|---|
| *H04R 1/00* | (2006.01) |
| *G10L 21/0364* | (2013.01) |
| *G06F 3/16* | (2006.01) |
| *H04R 1/02* | (2006.01) |
| *H04R 3/00* | (2006.01) |
| *A41D 13/11* | (2006.01) |
| *H04R 1/08* | (2006.01) |

(52) U.S. Cl.
CPC .......... *G10L 21/0364* (2013.01); *A41D 13/11* (2013.01); *G06F 3/165* (2013.01); *H04R 1/025* (2013.01); *H04R 1/08* (2013.01); *H04R 3/00* (2013.01); *H04R 2430/01* (2013.01)

(58) Field of Classification Search
CPC ..... G10L 21/0364; A41D 13/11; G06F 3/165; H04R 1/025; H04R 3/00; H04R 1/08; H04R 2430/01
USPC .......................................... 381/344, 333, 334
See application file for complete search history.

(56) References Cited

U.S. PATENT DOCUMENTS

| | | | |
|---|---|---|---|
| 4,980,926 A | 12/1990 | Noetzel | |
| 5,428,688 A | 6/1995 | Becker | |
| 5,455,869 A | 10/1995 | Miscavige | |
| D453,506 S | 2/2002 | Liou | |
| 2013/0214998 A1* | 8/2013 | Andes | G09G 5/10 345/8 |
| 2014/0216447 A1* | 8/2014 | Kihlberg | H04R 1/028 128/201.19 |

FOREIGN PATENT DOCUMENTS

WO    WO02091792    11/2002

* cited by examiner

*Primary Examiner* — Ammar T Hamid

(57) ABSTRACT

A voice transmitter assembly for enhancing verbal communication for a user wearing a face mask includes a clip that has a first member which is biased against a second member to engage a face mask. A microphone is coupled to the second member of the clip to capture words spoken by the user. A speaker is coupled to the first member of the clip to emit audible sounds to a listener. The speaker is in communication with the microphone thereby facilitating the speaker to emit sounds captured by the microphone. In this way the speaker can enhance the listener's ability to hear the words spoken by the user.

7 Claims, 3 Drawing Sheets

VOICE TRANSMITTER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transmitter devices and more particularly pertains to a new transmitter device for enhancing verbal communication for a user wearing a face mask. The device includes a clip that is attachable to the face mask. A microphone and a speaker are each coupled to the clip for amplifying words spoken by the user. In this way a listener can clearly hear the words spoken by the user.

(2) Description of Related Art Including Information Disclosed Under 37 CFR 1.97 and 1.98

The prior art relates to transmitter devices including a face mask microphone that employs a light emitter to transmit an audio signal through a window of a full face mask. The prior art discloses a variety of face masks that have a voice transmission mechanism integrated therein for transmitting a user's voice when the user is wearing the face mask. The prior art discloses a variety of face masks that have a microphone integrated into the face mask and a speaker that is remotely positioned with respect to the face mask.

Brief Summary of the Invention

An embodiment of the disclosure meets the needs presented above by generally comprising a clip that has a first member which is biased against a second member to engage a face mask. A microphone is coupled to the second member of the clip to capture words spoken by the user. A speaker is coupled to the first member of the clip to emit audible sounds to a listener. The speaker is in communication with the microphone thereby facilitating the speaker to emit sounds captured by the microphone. In this way the speaker can enhance the listener's ability to hear the words spoken by the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
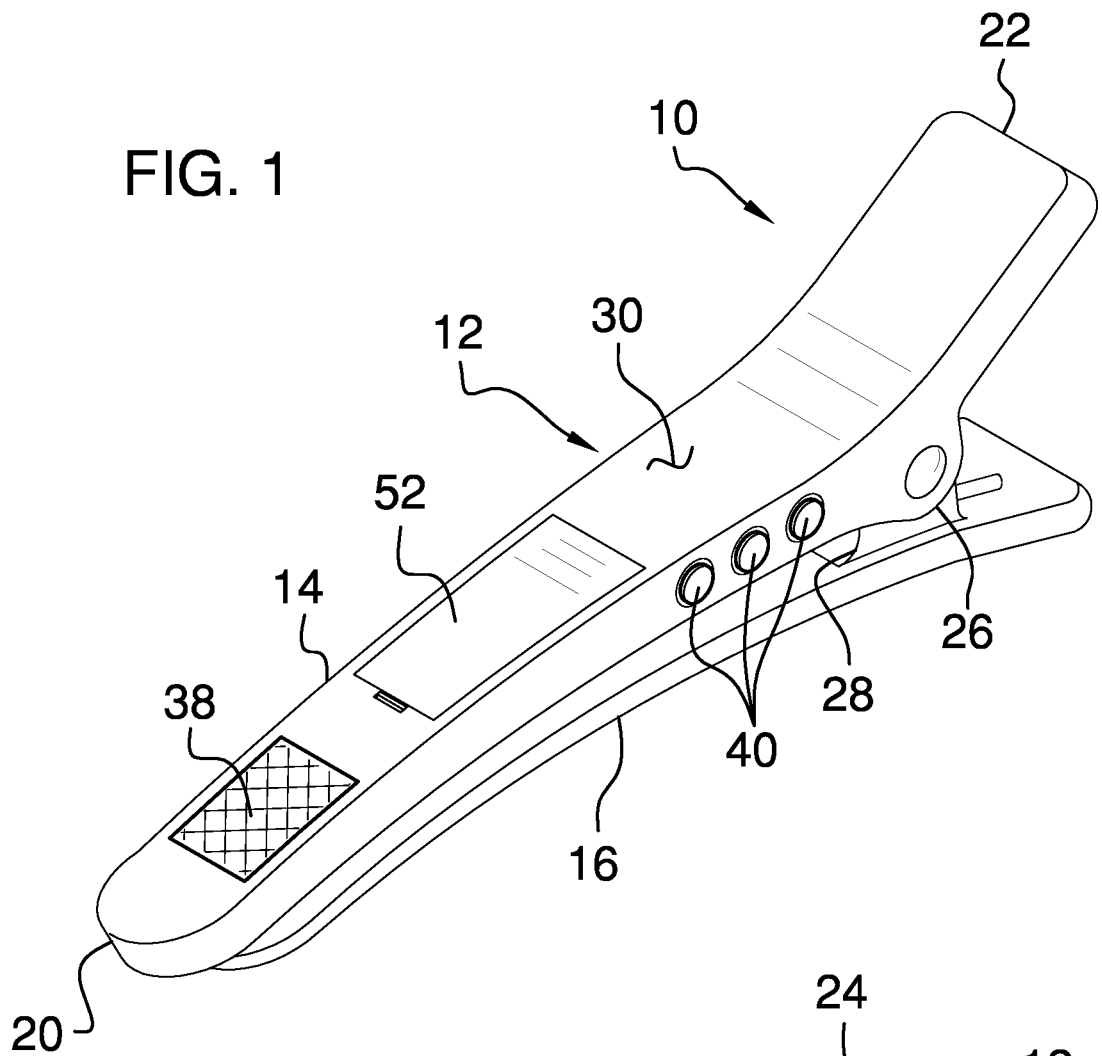
FIG. 1 is a perspective view of a voice transmitter assembly according to an embodiment of the disclosure.
Figure 2:
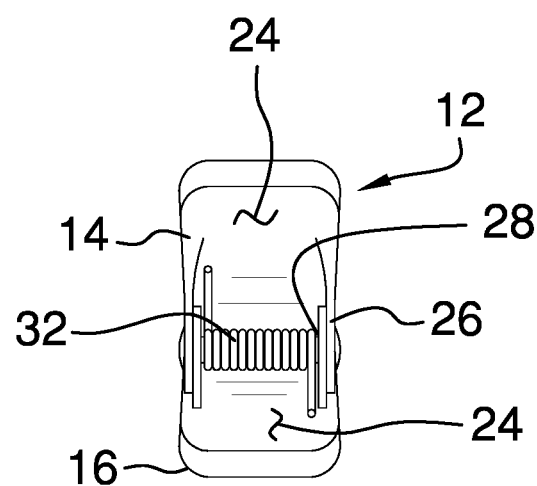
FIG. 2 is a back view of an embodiment of the disclosure.
Figure 3:
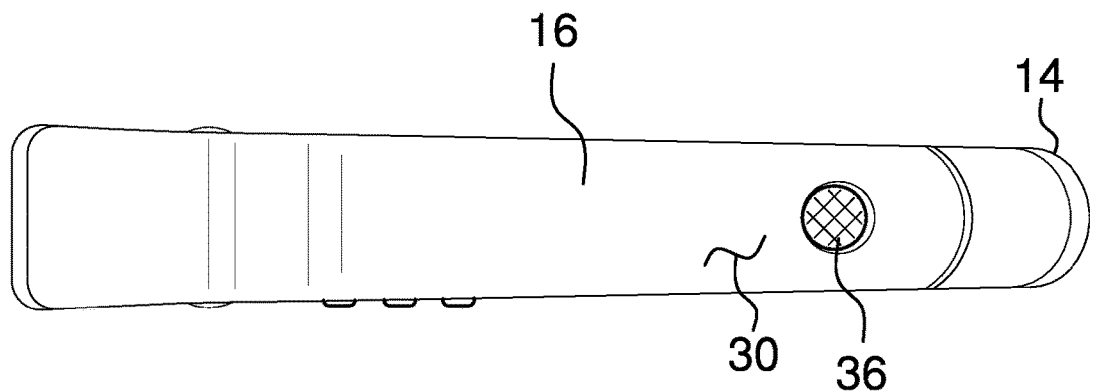
FIG. 3 is a back view of an embodiment of the disclosure.
Figure 4:
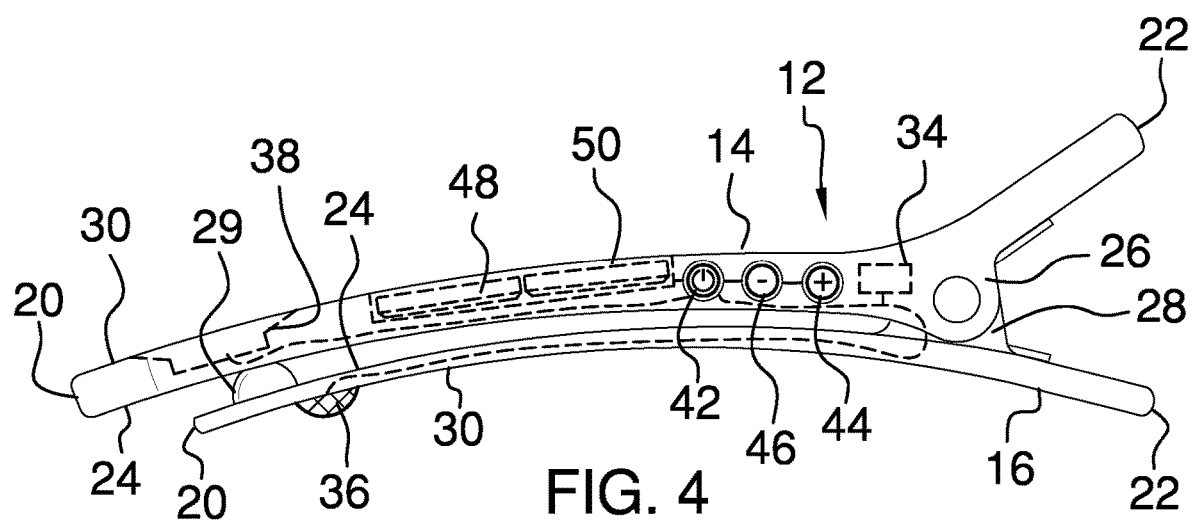
FIG. 4 is a left side phantom view of an embodiment of the disclosure.
Figure 5:
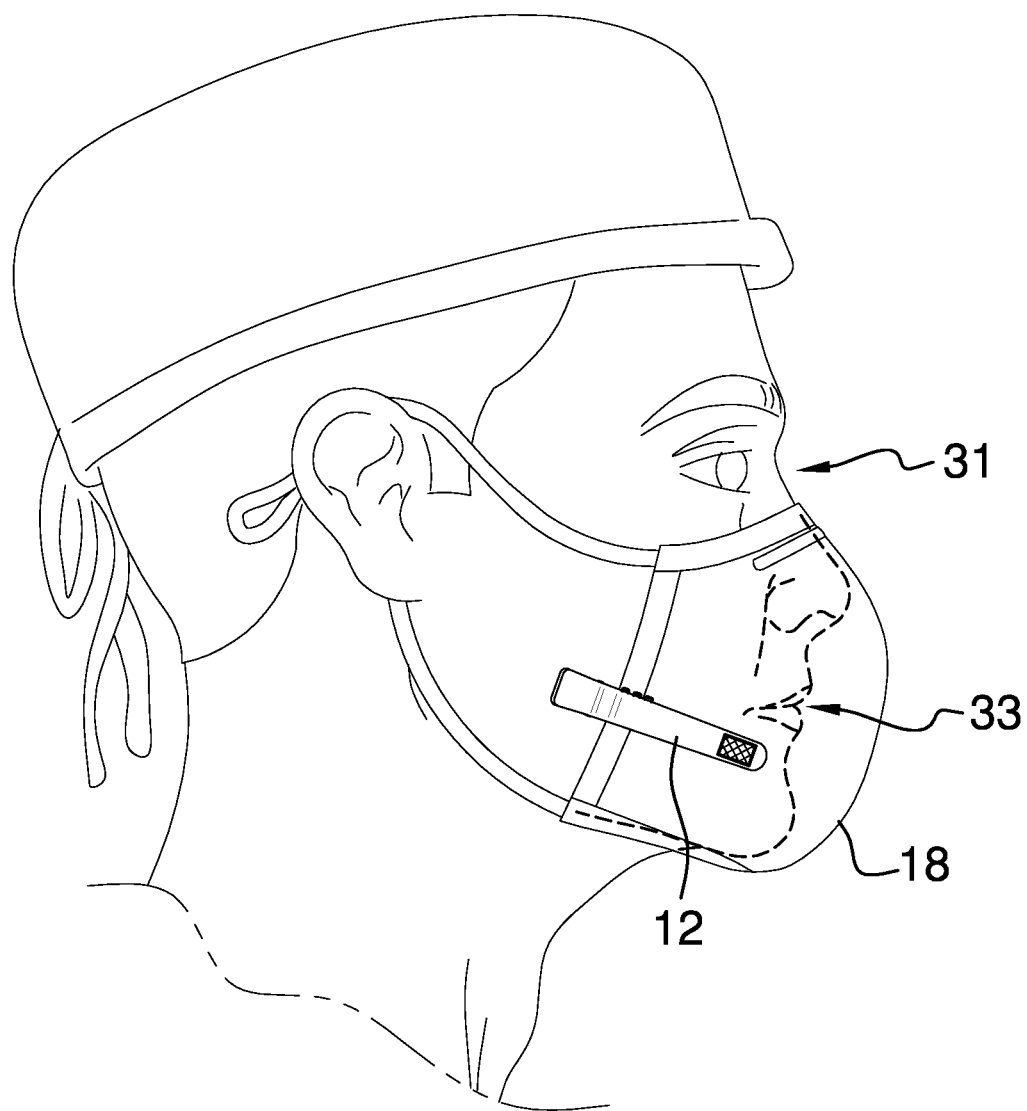
FIG. 5 is a phantom in-use view of an embodiment of the disclosure.

With reference now to the drawings, and in particular to FIGS. 1 through 5 thereof, a new transmitter device embodying the principles and concepts of an embodiment of the disclosure and generally designated by the reference numeral 10 will be described.

As best illustrated in FIGS. 1 through 5, the voice transmitter assembly 10 generally comprises a clip 12 that has a first member 14 that is biased against a second member 16 to facilitate the clip 12 to engage a face mask 18. Each of the first member 14 and the second member 16 has a first end 20, a second end 22 and a first surface 24 extending therebetween. Each of the first member 14 and the second member 16 is elongated between the first end 20 and the second end 22, and the first member 14 has a first coupling 26 extending away from the first surface 24 of the first member 14. The second member 16 has a second coupling 28 extending away from the first surface 24 of the second member 16. Moreover, the first coupling 26 pivotally engages the second coupling 28 having the first surface 24 of the first member 14 facing the first surface 24 of the second member 16.

Each of the first member 14 and the second member 16 is oriented to be coextensive with each other. Additionally, the first member 14 is curved at a point that is aligned with the first coupling 26 such that the second end 22 of the first member 14 is directed away from the second end 22 of the second member 16. In this way the second end 22 of the first member 14 can be urged toward the second end 22 of the second member 16 by a user for positing the clip 12 in an open position. Each of the first member 14 and the second member 16 has a second surface 30 extending between the first end 20 and the second end 22.

A biasing member 32 is coupled between the first coupling 26 and the second coupling 28. The biasing member 32 biases the clip 12 into a closed position having the first member 14 being compressed against the second member 16. As is most clearly shown in FIG. 4, a knob 29 may be coupled to the first surface 24 of the second member 16. The knob 29 may be compressed against the first surface 24 of the first member 14 when the clip 12 is in the closed position for securely engaging the face mask 18.

The clip 12 is urgeable into an open position when the second end 22 of the first member 14 is urged toward the second end 22 of the second member 16 such that the first member 14 is spaced from the second member 16. In this way the clip 12 can facilitate the face mask 18 to be positioned between the first member 14 and the second member 16 having the second member 16 being positioned between the face mask 18 and the user's face 31. The face mask 18 may be personal protection equipment that is worn in a surgical environment, during a pandemic or any other type of face mask 18 that covers the user's mouth 33.

A control circuit 34 is provided and the control circuit 34 is integrated into the clip 12. A microphone 36 is coupled to the second member 16 of the clip 12 such that the microphone 36 is directed toward the user's mouth 33 when the clip 12 is engaged to the face mask 18. In this way the microphone 36 can capture words spoken by the user. The microphone 36 is positioned on the second surface 30 of the second member 16, and the microphone 36 is positioned adjacent to the first end 20 of the second member 16. Additionally, the microphone 36 is electrically coupled to the control circuit 34 and the microphone 36 may comprise an electronic microphone of any conventional design.

A speaker 38 is coupled to the first member 14 of the clip 12 and the speaker 38 is exposed when the clip 12 is engaged to the face mask 18. In this way the speaker 38 can emit audible sounds to a listener. The speaker 38 is in communication with the microphone 36 thereby facilitating the speaker 38 to emit sounds captured by the microphone 36. In this way the speaker 38 can enhance the listener's ability to hear the words spoken by the user. The speaker 38 is positioned on the second surface 30 of the first member 14 and the speaker 38 is positioned adjacent to the first end 20 of the first member 14. Additionally, the speaker 38 is electrically coupled to the control circuit 34 and the speaker 38 may comprise an electronic speaker of any conventional design.

A plurality of control buttons 40 is each movably integrated into the clip 12 such that each of the control buttons 40 can be manipulated by the user. Each of the control buttons 40 is communication with the speaker 38 and the microphone 36 for controlling operational parameters of the speaker 38 and the microphone 36. Each of the control buttons 40 is positioned on the first member 14 and each of the control buttons 40 is electrically coupled to the control circuit 34. The plurality of control buttons 40 includes a power button 42, a volume up button 44 and a volume down button 46. The power button 42 turns the control circuit 34 on and off, the volume up button 44 increases the volume of the speaker 38 toward a maximum volume, and the volume down button 46 decreases the volume of the speaker 38 toward a minimum volume.

A power supply 48 is removably integrated into the first member 14 of the clip 12. The power supply 48 is electrically coupled to the control circuit 34 and the power supply 48 comprises at least one battery 50. The power supply 48 is positioned inside of the first member 14. A battery cover 52 is removably coupled to the second surface 30 of the first member 14 and the at least one battery 50 is positioned beneath the battery cover 52.

In use, the clip 12 is clipped onto the face mask 18 when the face mask 18 is being worn such that the microphone 36 is directed toward the user's face 31 and the speaker 38 is exposed. In this way the microphone 36 captures the words that the user speaks and the speaker 38 emits the words the user speaks. Thus, the listener can clearly understand the words that the user speaks while the user is wearing the face mask 18. The face mask 18 can be worn with or without the clip 12 being attached to the face mask 18, depending on the user's preference.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A voice transmitter assembly for clipping onto a face mask thereby amplifying words spoken by a user to enhance the user's ability to verbally communicate while wearing the face mask, said assembly comprising:

a clip having a first member being biased against a second member wherein said clip is configured to engage a face mask;

a microphone being coupled to said second member of said clip wherein said microphone is configured to be directed toward the user's mouth when said clip is engaged to the face mask thereby facilitating said microphone to capture words spoken by the user;

a speaker being coupled to said first member of said clip wherein said speaker is configured to be exposed when said clip is engaged to the face mask thereby facilitating said speaker to emit audible sounds to a listener, said speaker being in communication with said microphone thereby facilitating said speaker to emit sounds captured by said microphone wherein said speaker is configured to enhance the listener's ability to hear the words spoken by the user;

a control circuit being integrated into said clip;

a plurality of control buttons, each of said control buttons being movably integrated into said clip wherein each of said control buttons is configured to be manipulated by the user, each of said control buttons being communication with said speaker and said microphone for controlling operational parameters of said speaker and said microphone, each of said control buttons being positioned on said first member, each of said control buttons being electrically coupled to said control circuit, said plurality of control buttons including a power button, a volume up button and a volume down button, said power button turning said control circuit on and off, said volume up button increasing the volume of said speaker toward a maximum volume, said volume down button decreasing the volume of said sneaker toward a minimum volume; and a power supply being removably integrated into said first member of said clip, said power supply being electrically coupled to said control circuit, said power supply comprising at least one battery.

2. A voice transmitter assembly for clipping onto a face mask thereby amplifying words spoken by a user to enhance the user's ability to verbally communicate while wearing the face mask, said assembly comprising:

a clip having a first member being biased against a second member wherein said clip is configured to engage a face mask;

a microphone being coupled to said second member of said clip wherein said microphone is configured to be directed toward the user's mouth when said clip is engaged to the face mask thereby facilitating said microphone to capture words spoken by the user;

a speaker being coupled to said first member of said clip wherein said speaker is configured to be exposed when said clip is engaged to the face mask thereby facilitating said speaker to emit audible sounds to a listener, said speaker being in communication with said microphone thereby facilitating said speaker to emit sounds captured by said microphone wherein said speaker is configured to enhance the listener's ability to hear the words spoken by the user; and wherein each of said first member and said second member has a first end, a second end and a first surface extending therebetween, each of said first member and said second member being elongated between said first end and said second end, said first member having a first coupling extending away from said first surface of said first member, said second member having a second coupling extending away from said first surface of said second member, said first coupling pivotally engaging said second coupling having said first surface of said first member facing said first surface of said second member, each of said first member and said second member being oriented to be coextensive with each other.

3. The assembly according to claim 2, wherein said first member is curved at a point being aligned with said first coupling such that said second end of said first member is directed away from said second end of said second member wherein said second end of said first member is configured to be urged toward said second end of said second member by a user for urging said clip in an open position, each of said first member and said second member having a second surface extending between said first end and said second end.

4. The assembly according to claim 2, further comprising a biasing member being coupled between said first coupling and said second coupling, said biasing member biasing said clip into a closed position having said first member being compressed against said second member, said clip being urgeable into an open position when said second end of said first member is urged toward said second end of said second member such that said first member is spaced from said second member wherein said clip is configured to facilitate the face mask to be positioned between said first member and said second member having said second member being positioned between the face mask and the user's face.

5. The assembly according to claim 4, wherein:

said microphone is positioned on said second surface of said second member thereby facilitating said microphone to be directed toward the user's face when said clip is engaged on the face mask, said microphone being positioned adjacent to said first end of said second member; and said speaker is positioned on said second surface of said first member thereby facilitating said speaker to be exposed with respect to the face mask when said clip is engaged to the face mask, said speaker being positioned adjacent to said first end of said first member.

6. The assembly of claim 1, further comprising:

each of said first member and said second member having a first end, a second end and a first surface extending therebetween, each of said first member and said second member being elongated between said first end and said second end, said first member having a first coupling extending away from said first surface of said first member, said second member having a second coupling extending away from said first surface of said second member, said first coupling pivotally engaging said second coupling having said first surface of said first member facing said first surface of said second member, each of said first member and said second member being oriented to be coextensive with each other, said first member being curved at a point being aligned with said first coupling such that said second end of said first member is directed away from said second end of said second member wherein said second end of said first member is configured to be urged toward said second end of said second member by a user for urging said clip in an open position, each of said first member and said second member having a second surface extending between said first end and said second end;

a biasing member being coupled between said first coupling and said second coupling, said biasing member biasing said clip into a closed position having said first member being compressed against said second member, said clip being urgeable into an open position when said second end of said first member is urged toward said second end of said second member such that said first member is spaced from said second member wherein said clip is configured to facilitate the face mask to be positioned between said first member and said second member having said second member being positioned between the face mask and the user's face;

said microphone being electrically coupled to said control circuit, said microphone being positioned on said second surface of said second member, said microphone being positioned adjacent to said first end of said second member;

said speaker being electrically coupled to said control circuit, said speaker being positioned on said second surface of said first member, said speaker being positioned adjacent to said first end of said first member.

7. A voice transmitter system for clipping onto a face mask thereby amplifying words spoken by a user to enhance the user's ability to verbally communicate while wearing the face mask, said system comprising:

a face mask being wearable on a user's face such that said face mask covers the user's mouth, said face mask having a first lateral edge;

a clip having a first member being biased against a second member to facilitate said clip to engage said face mask, each of said first member and said second member having a first end, a second end and a first surface extending therebetween, each of said first member and said second member being elongated between said first end and said second end, said first member having a first coupling extending away from said first surface of said first member, said second member having a second coupling extending away from said first surface of said second member, said first coupling pivotally engaging said second coupling having said first surface of said first member facing said first surface of said second member, each of said first member and said second member being oriented to be coextensive with each other, said first member being curved at a point being aligned with said first coupling such that said second end of said first member is directed away from said second end of said second member wherein said second end of said first member is configured to be urged toward said second end of said second member by a user for urging said clip in an open position, each of said first member and said second member having a second surface extending between said first end and said second end;

a biasing member being coupled between said first coupling and said second coupling, said biasing member biasing said clip into a closed position having said first member being compressed against said second member, said clip being urgeabie into an open position when said second end of said first member is urged toward said second end of said second member such that said first member is spaced from said second member facilitate said face mask to be positioned between said first member and said second member having said second member being positioned between said face mask and the user's face;

a control circuit being integrated into said clip;

a microphone being coupled to said second member of said clip wherein said microphone is configured to be directed toward the user's mouth when said clip is engaged to said face mask thereby facilitating said microphone to capture words spoken by the user, said microphone being electrically coupled to said control circuit, said microphone being positioned on said second surface of said second member, said microphone being positioned adjacent to said first end of said second member;

a speaker being coupled to said first member of said clip such that said speaker is exposed when said clip is engaged to said face mask thereby facilitating said speaker to emit audible sounds to a listener, said speaker being in communication with said microphone thereby facilitating said speaker to emit sounds captured by said microphone wherein said speaker is configured to enhance the listener's ability to hear the words spoken by the user, said speaker being electrically coupled to said control circuit, said speaker being positioned on said second surface of said first member, said speaker being positioned adjacent to said first end of said first member;

a plurality of control buttons, each of said control buttons being movably integrated into said clip wherein each of said control buttons is configured to be manipulated by the user, each of said control buttons being communication with said speaker and said microphone for controlling operational parameters of said speaker and said microphone, each of said control buttons being positioned on said first member, each of said control buttons being electrically coupled to said control circuit, said plurality of control buttons including a power button, a volume up button and a volume down button, said power button turning said control circuit on and off, said volume up button increasing the volume of said speaker toward a maximum volume, said volume down button decreasing the volume of said speaker toward a minimum volume; and a power supply being removably integrated into said first member of said clip, said power supply being electrically coupled to said control circuit, said power supply comprising at least one battery.

* * * * *